Sept. 1, 1970    M. T. BAKER    3,526,147
POWER TRANSMISSION

Filed Oct. 16, 1968    4 Sheets-Sheet 2

INVENTOR.
Martin T. Baker
BY Webb, Burden, Robinson, Webb
HIS ATTORNEYS

Sept. 1, 1970  M. T. BAKER  3,526,147
POWER TRANSMISSION
Filed Oct. 16, 1968  4 Sheets-Sheet 3
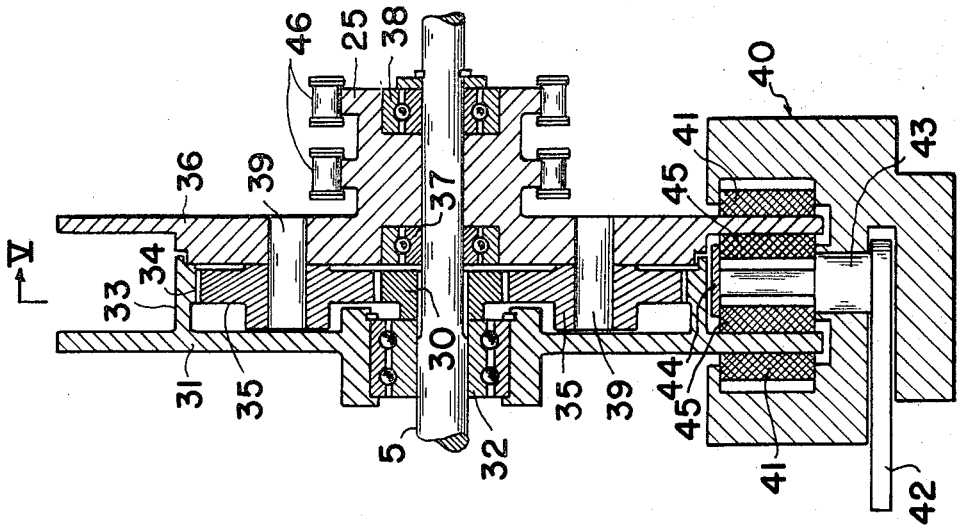
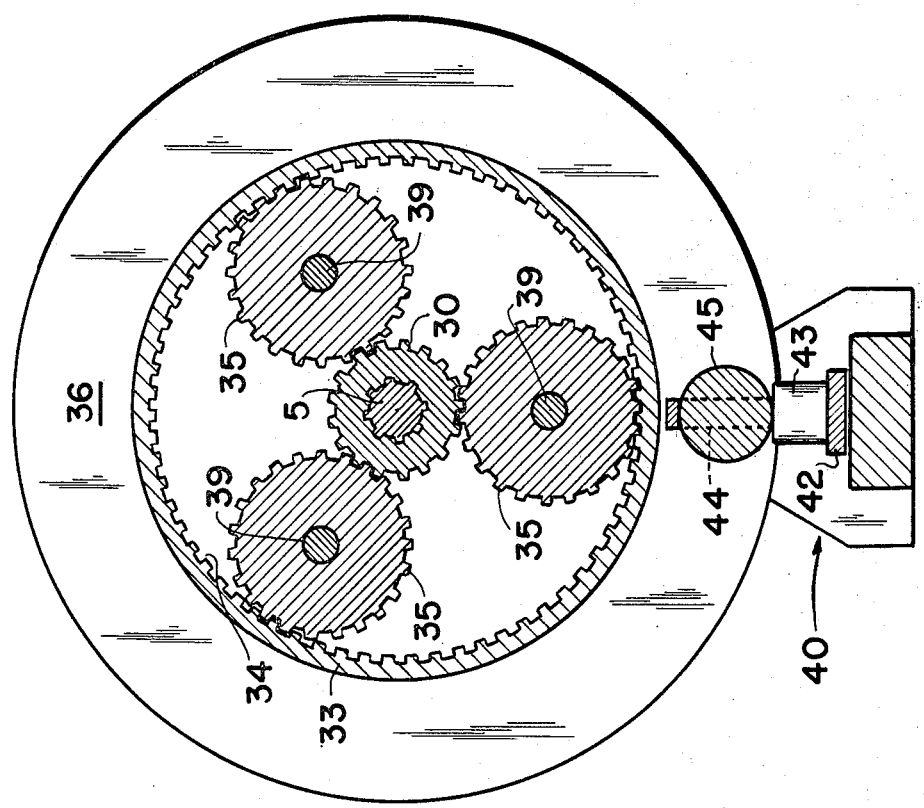
INVENTOR.
Martin T. Baker
HIS ATTORNEYS

United States Patent Office 3,526,147
Patented Sept. 1, 1970

3,526,147
POWER TRANSMISSION
Martin T. Baker, Fort Lauderdale, Fla., assignor to ATV, Inc., Pittsburgh, Pa., a corporation of Pennsylvania
Filed Oct. 16, 1968, Ser. No. 768,027
Int. Cl. F16h 37/00, 37/06, 57/10
U.S. Cl. 74—15.2               10 Claims

ABSTRACT OF THE DISCLOSURE

A power transmission having a main shaft around a portion of which a power input shaft is concentrically mounted. Power is transmitted to the main shaft through gear means including a sun gear splined to the power input shaft, spur gears mounted around and driven by the sun gear, and a ring gear driven by the spur gears. A drive sleeve is slidably mounted around and keyed to the main shaft. Dogs extending from opposing faces of the drive sleeve engage mating dogs on either the sun gear or the ring gear to drive the main shaft either clockwise or counterclockwise. Power output means includes a sun gear splined to the main shaft and planetary gears positioned around and driven by the sun gear. A brake disk mounted around the main shaft is fastened to the planetary gears. A clutch disk mounted around the main shaft adjacent the brake disk is driven by the planetary gears. Means are provided to alternatively hold either the clutch disk or the brake disk. Power take-off means are attached to the brake disk.

My invention relates to a power transmission and, more particularly, to a cross transmission for propelling and controlling small self-powered vehicles adapted for travel on land and water.

In specialty vehicles, such as all-terrain vehicles which are designed to travel on all types of land terrain and in water, weight and size are critical. The vehicle and all its component parts must be rugged in order to withstand the forces encountered in operation under extreme conditions. Yet the cost of the vehicle must be kept to a minimum. Therefore, it is important that the power transfer unit be of a rugged design that is simple both in construction and operation. It should be compact and lightweight. It is also important that the power transmission be accomplished in the most efficient manner possible in order that the size of the engine may be minimized.

By utilizing the power transmitted to the wheels of such a vehicle for steering the vehicle, as well as powering it, an overall simplicity of design and a substantial weight reduction can be achieved. The need for a separate steering unit is eliminated and all of the vehicle wheels can be mounted on fixed axles.

Transmissions have been developed which are designed for this bifunctional purpose, i.e., propulsion and directional control. However, such power transfer units, particularly those designed for use in small, multiple terrain vehicles, have not been reliable. My invention provides a transmission which is simple in design and completely reliable yet is compact, lightweight and bifunctional.

Briefly stated, my transmission comprises a main shaft which is adapted to extend laterally across the body of a motor powered vehicle. A power input shaft is mounted concentrically around a portion of the main shaft for rotation independent of the main shaft.

Power is transmitted from the input shaft to the main shaft by a gear means. A sun gear is concentrically mounted to the power input shaft and rotates with the power input shaft. Engaging means such as dogs extend outwardly from one face of the sun gear. A plurality of spur gears are positioned around the sun gear and driven by it. A ring gear is concentrically mounted around the main shaft and driven by the spur gears in a direction opposite to the direction of rotation of the sun gear. Engaging means extend outwardly from a face of the ring gear. A drive sleeve is longitudinally, slidably mounted around the main shaft and rotates with the main shaft. However, it may be moved longitudinally along a portion of the main shaft. The drive sleeve has an outwardly extending projection which extends between the face of the sun gear and the face of the ring gear from which the engaging means project. Each face of the projection has engaging means extending from it which are designed to mate with the engaging means extending from the face of the sun gear and the face of the ring gear, respectively. Means are provided for sliding the drive sleeve along the main shaft into engagement with the sun gear in one position and into engagement with the ring gear in another position.

A power output means is connected to the main shaft. It includes a sun gear which is concentrically mounted on the main shaft and which rotates with the main shaft. A plurality of planetary gears is positioned around and driven by the sun gear. A brake disk is positioned around the main shaft and is fastened to the planetary gears. A clutch disk is positioned around the main shaft and has inner gear teeth meshing with the planetary gears which drive the clutch disk. Braking means are provided to selectively prevent rotation of either the brake disk or the clutch disk. A power take-off means is affixed to the brake disk.

In the accompanying drawings, I have shown the present preferred embodiment of my invention in which:

FIG. 4 is an enlarged longitudinal section of a portion of the transmission showing the power output means;

FIG. 5 is a section taken along line V—V of FIG. 4;

Figure 1:
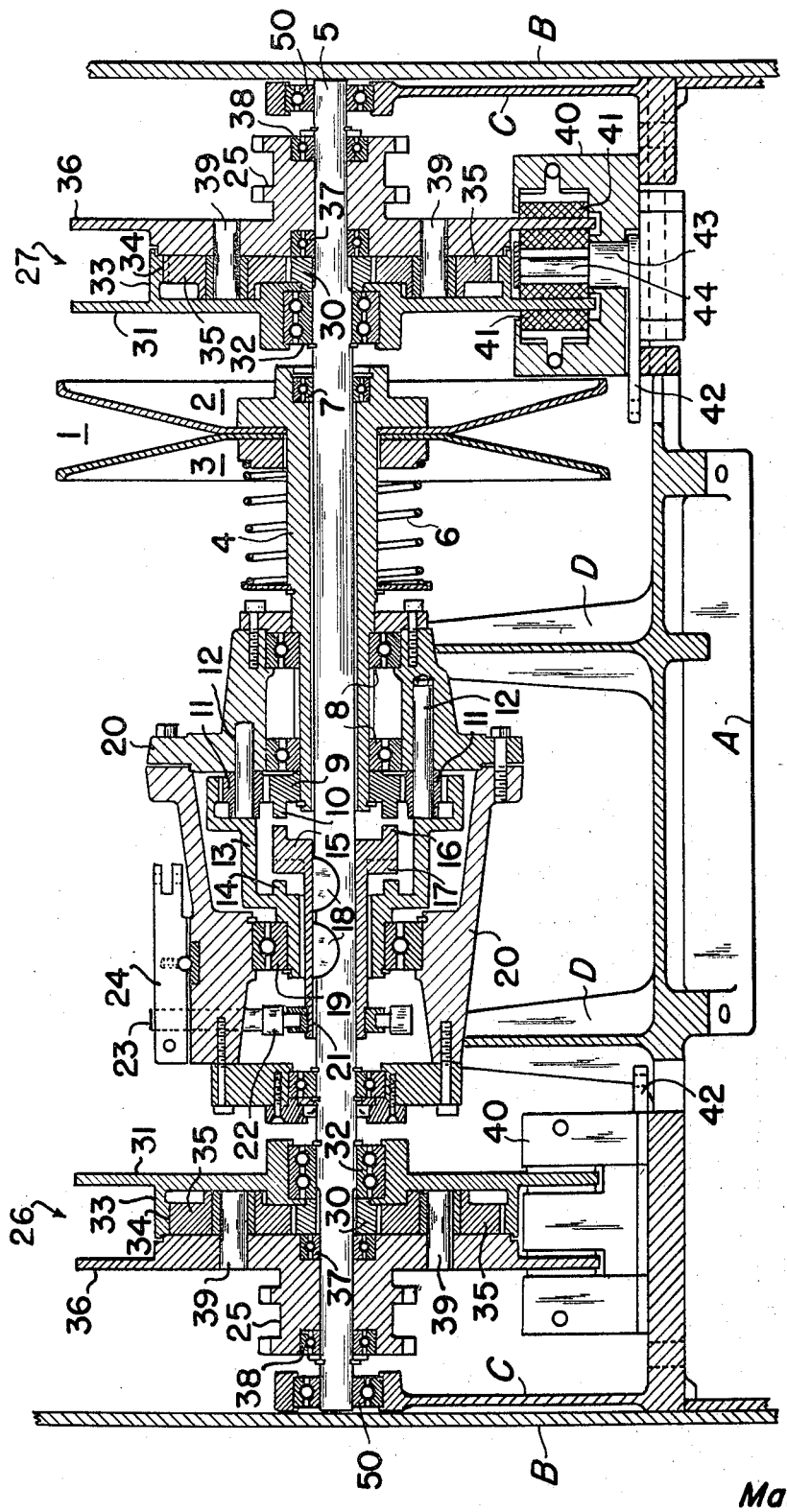
FIG. 1 is a longitudinal cross-section of the transmission.

Referring to FIG. 1, a mounting frame having a base A and vertical legs C and D is fastened to the side walls B of the vehicle in which the transmission is to be mounted. The entire mounting frame is preferably made as a single, aluminum casting. Main shaft 5 of my transmission extends longitudinally through the entire transmission unit. The outside ends of the shaft 5 are supported in bearings 50 by side legs C. Legs D support housing 20 which encloses the gear means for transmitting power from power input shaft 4 to the main shaft 5 as described hereinafter. Base A of the mounting frame may also support an engine for powering the vehicle.

A power input shaft 4 is mounted concentrically around a portion of the main shaft 5 and may rotate independently of the rotation of the main shaft. One end of the input shaft is located outside of housing 20 and is supported by bearing 7. The other end extends into the housing 20 and is separated from the housing by bearings 8. Power may be transferred from the engine to the input shaft 4 by any suitable means. I prefer to use a belt drive (not shown) from the engine to a conventional torque converter 1. Torque converter 1 comprises a split pulley having halves 2 and 3. Half 2 is rigidly mounted on power input shaft 4 which is concentric with and spaced apart from the main transmission power shaft 5. Half 3 of torque converter 1 is slidably mounted on input shaft 4 and spring biased towards half 2 by spring 6. The force generated by rotation of the converter at high speeds of the engine cause half 3 to overcome the spring bias and permit the belt to ride closer to the input shaft 4. This permits the obtention of higher speeds with less torque, and conversely, when speeds diminish, and more torque is required, the spring bias will force the halves together and thus the belt further from the shaft to increase the torque.

Figure 2:
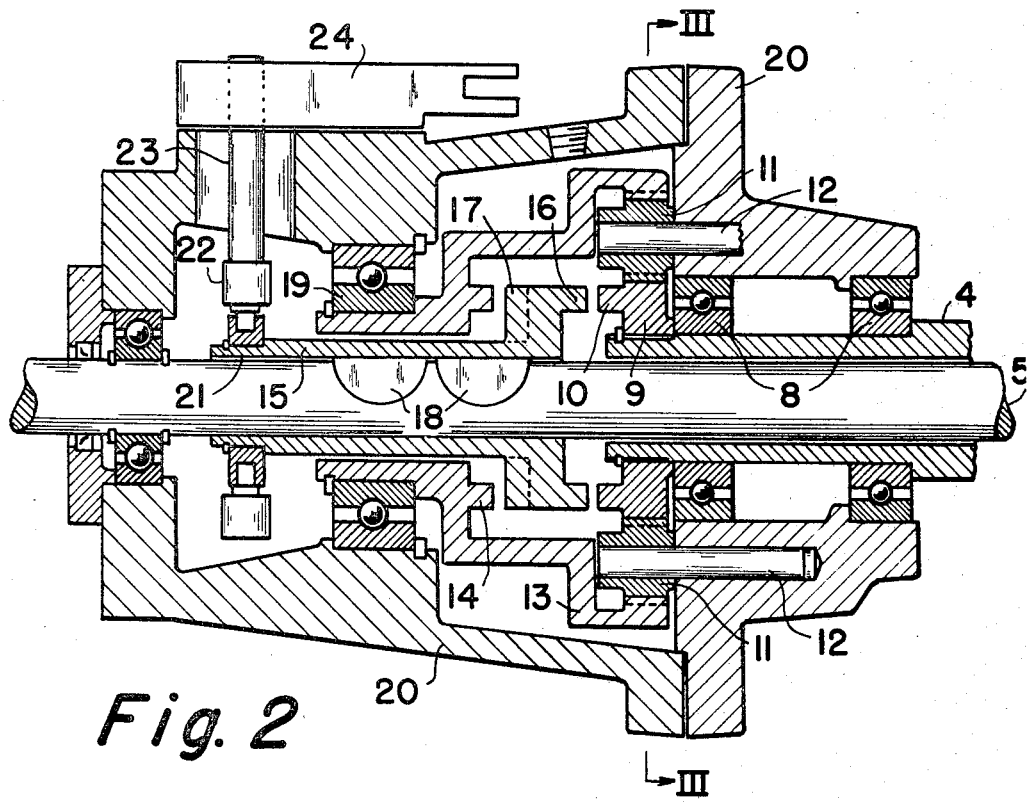
FIG. 2 is an enlarged longitudinal section of a portion of the transmission showing the gear means which transmits power from the input shaft to the main shaft.
Figure 3:
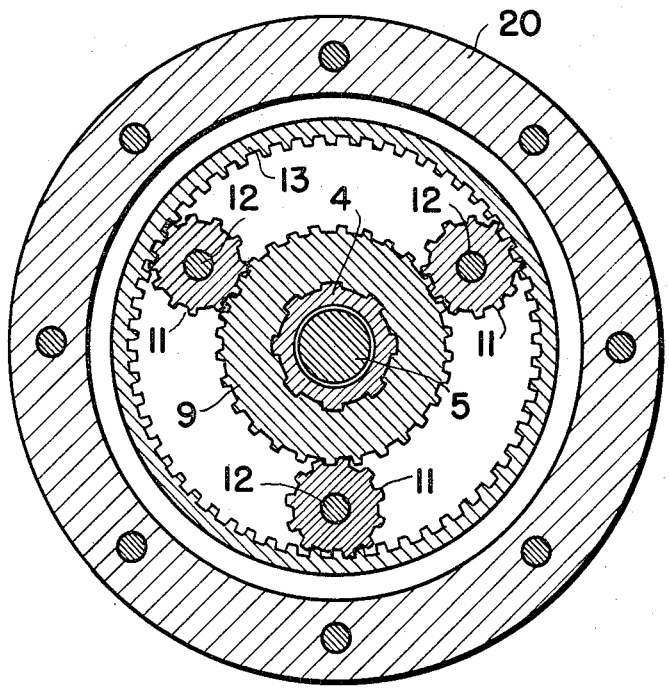
FIG. 3 is a section taken along line III—III of FIG. 2.

Inside housing 20 (see FIGS. 2 and 3) a sun gear 9 is splined on input shaft 4. A plurality of dogs 10 extend outwardly from one face of the sun gear. Sun gear 9 rotates with shaft 4 about the axis of the main shaft 5. In an epicyclic gear train with sun gear 9 is a plurality of spur gears 11. Preferably, three spur gears are mounted about the sun gear and driven by it; however, the number is discretionary as are their ratios. The spur gears 11 are mounted to the transmission housing 20 by means of pinion pins 12.

The epicyclic gear train of the transmission is completed by a ring gear 13 which is positioned around the main shaft 5 and rotates about the axis of the main shaft. One portion of the ring gear has internal teeth which mesh with the teeth on the spur gears whereby the ring gear is driven by the spur gears in a direction opposite to the direction of rotation of the sun gear and the input shaft 4.

A portion of the ring gear extends longitudinally along the main shaft away from the portion having the internal teeth. This portion is spaced from housing 20 by bearing 19 and provides a face parallel to and spaced from the face on the sun gear from which dogs 10 extend. Dogs 14 extend from this face of the ring gear toward but spaced from the dogs on the sun gear.

A drive sleeve 15 is slidably mounted around the main shaft and is keyed to the main shaft so that it rotates with the main shaft. It has a groove 21 throughout its length. The main shaft 5 is provided with a pair of woodruff keys 18 at the drive sleeve. These keys are positioned to fit into groove 21 to connect the drive sleeve to the main shaft. Thus, the drive sleeve 15 is slidable along the shaft with the sleeve positioned by the groove and keys but rotates with the main shaft.

The drive sleeve has a flanged portion which extends into the space between the dogs 10 extending from the sun gear and the dogs 14 extending from the ring gear. Dogs 16 and 17 extend from the faces of the flanged portion and are adapted to mesh with dogs 10 and dogs 14, respectively. Only one set of dogs is engageable at any one time and there is sufficient space between dogs 10 and 14 to allow for complete disengagement of all dogs.

Figure 6:
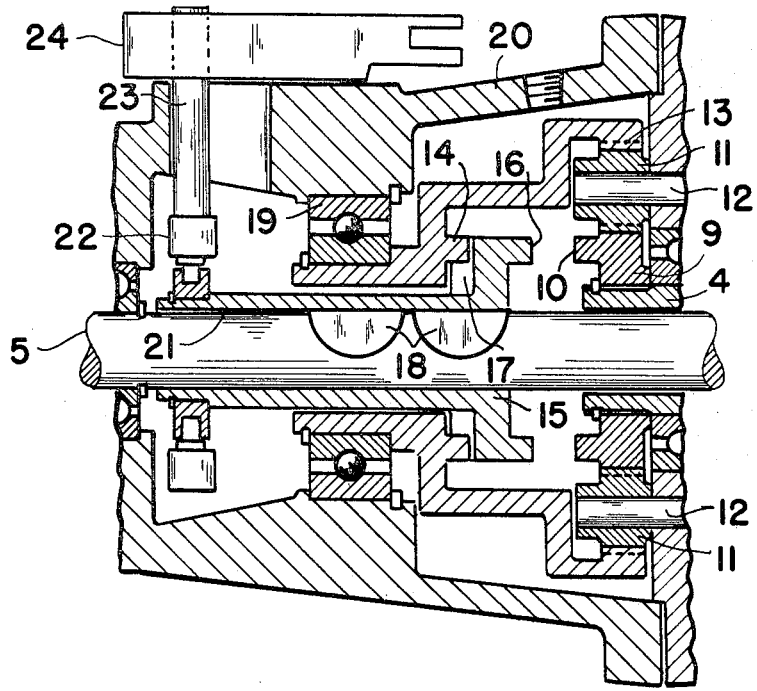
FIG. 6 is a view similar to FIG. 2 showing the transmission in position to drive the main shaft in the opposite direction from the input shaft; and, FIG. 7 is a view similar to FIG. 6 showing the transmission in position to drive the main shaft in the same direction as the power input shaft.
Figure 7:
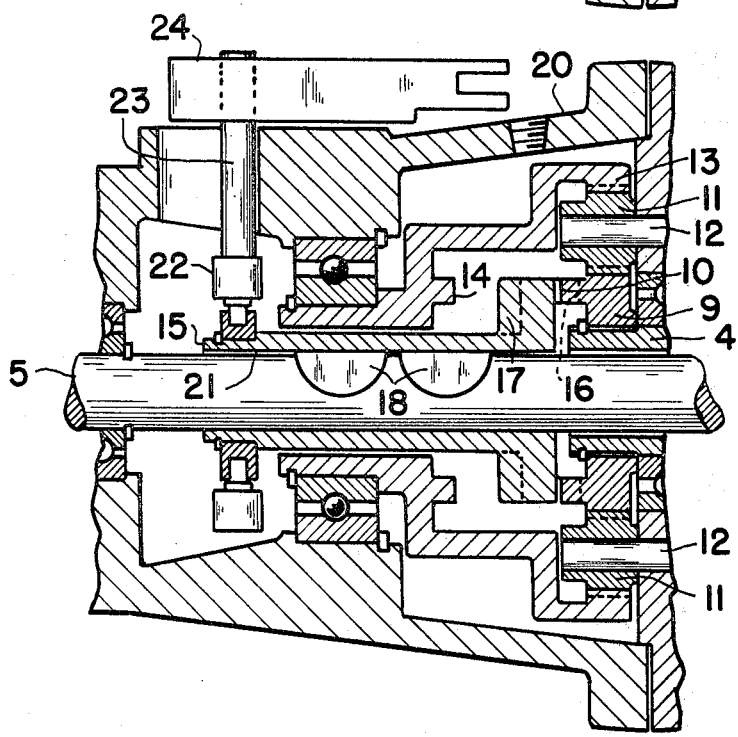

When all the dogs are disengaged, no rotation is transmitted from the power input shaft to the main shaft. When dogs 10 and 16 are engaged the main shaft is driven through the sun gear and drive sleeve in the same direction as the power input shaft (see FIG. 7). When dogs 14 and 17 are engaged the main shaft is driven through the sun gear, spur gears, ring gear and drive sleeve in the opposite direction from the power input sleeve (see FIG. 6).

The drive sleeve is moved into and out of engagement with the sun gear and ring gear by means of a shift mechanism that includes a shift yoke 22, a shift yoke shaft 23 and a shift lever 24, all of relatively conventional design.

Referring to FIGS. 1, 4 and 5, the transmission is provided with a pair of spaced apart power output units designated generally 26 and 27. Each power unit includes a sun gear 30 splined to the main shaft 5. A plurality of planetary gears 35, preferably three, are positioned around the sun gear and driven by the sun gear. A brake disk 36 is mounted on bearings 37 and 38 about the main shaft. Planetary gears 35 are pinned by pins 39 to the brake disk.

A clutch disk 31 is mounted on bearing 32 around main shaft 5 adjacent the brake disk. An outwardly extending portion of the clutch disk faces a similar portion of the brake disk. The clutch disk has a flange portion 33 having internal gear teeth 34 which mesh with the planetary gears whereby the clutch disk is driven by the planetary gears.

Each output unit includes a brake means designated generally 40. Each brake means includes a pair of nonmovable brake pads 41 positioned on the outboard sides of the outwardly extending portions of the brake and clutch disks. Movable brake pads 45 are positioned between the outwardly extending portions of the brake and clutch disks. A control lever 42 has a circularly raised flange 43. On top of each flange 43 is T-rod cam 44 positioned off the center axis of the flange. Brake pads 45 are mounted on each arm of the T-rod. Because the T-rod cam is mounted off-center, a movement of the lever to or away from the drawing creates a cam action and forces one of the brake pads 45 to hold one of the disks. Preferably, when the brake pads are disengaged from the disks, the space therebetween is approximately .050".

Power take-off means such as sprockets 25 for a drive chain 45 are formed integrally with or fastened to the brake disks 36.

When the transmission is installed in a small vehicle having a left set of wheels and a right set of wheels, the left set of wheels is power-controlled by output 27 and the right set of wheels is power-controlled by output 26. Connection to the wheels is through a drive chain 46 attached to sprockets 25. With the main shaft 5 revolving, operation of the vehicle would proceed as follows:

To cause the vehicle to move in a straight forward direction, lever 42 of each brake would be independently moved to cause each brake 45 to hold the respective clutch disks 31. With the clutch disks stationary the sun gear 30 will cause the planetary gears 35 to rotate about internal gear teeth 34 of the clutch disk. This rotation will in turn cause the brake disk to rotate since the planetary gears are pinned to those disks. The rotation of the brake disk drives the wheels through chain 46.

To stop the vehicle, levers 42 would move in exactly the opposite direction as before. This would cause brake disks to be held stationary and consequently the wheels are stopped. The planetary gears will rotate and cause the clutch disk to rotate freely.

To directionally control or steer the vehicle a combination of both stopping and powering the wheels is used. For example, to turn left the wheels on the left-hand side of the vehicle are stopped and the wheels on the right-hand side of the vehicle powered. Thus, the brake disk of unit 27 would be held stationary permitting the clutch disk but not the wheels to rotate. The clutch disk of unit 26 would, on the other hand, be held permitting the brake disk and consequently the wheels to rotate. Therefore, powering the right side of the vehicle while holding the left side substantially stationary permits the vehicle to make a skid turn to the left. A right turn is effectuated in just the opposite manner.

As is readily apparent, this mode of operation is just as effective in water as on land. The entire operation of the vehicle is effected by two levers connected one each to the outputs and the shift lever. This unit also does away with conventional hydraulic systems as well as other complexities.

While I have described a preferred embodiment of my invention, it may be otherwise embodied within the scope of the appended claims.

I claim:
1. A power transmission comprising:
 (A) a main shaft;
 (B) a power input shaft concentric with the main shaft and mounted around a portion of the main shaft for rotation independent of the rotation of the main shaft;

(C) gear means for transmitting power from the power input shaft to the main shaft, said gear means including
  (1) a sun gear splined to the power input shaft and having a plurality of engaging means extending from one face of the gear,
  (2) a plurality of spur gears driven by the sun gear,
  (3) a ring gear mounted around the main shaft and driven by the spur gears in a direction opposition to the direction of rotation of the sun gear and having a plurality of engaging means extending from one face,
  (4) a drive sleeve slidably mounted around the main shaft and keyed to the main shaft and having a plurality of engaging means extending from each of two opposite faces, one set of engaging means adapted to engage the engaging means extending from the sun gear and the second set adapted to engage the engaging means extending from the face of the ring gear,
  (5) means for sliding the drive sleeve along the main shaft to engage the engaging means on the drive sleeve selectively with the engaging means extending from the sun gear and the engaging means extending from the ring gear, (D) power output means connected to the main shaft, said means including:
  (1) a sun gear splined to the main shaft,
  (2) a plurality of planetary gears positioned around the sun gear and driven by the sun gear,
  (3) a brake disk mounted around the main shaft and fastened to the planetary gears,
  (4) a clutch disk mounted around the main shaft adjacent the brake disk, said disk having gear teeth meshing with the planetary gears,
  (5) braking means positioned to selectively prevent rotation of one of the brake disk and the clutch disk, and
  (6) power take-off means affixed to the brake disk.

2. A transmission as claimed in claim 1 wherein two independent output means are positioned one on each side of the main power shaft.

3. A transmission as claimed in claim 1 in which the engaging means on the sun gear, ring gear and drive sleeve are mating dogs.

4. A transmission as claimed in claim 1 in which a torque converter is fastened to the power input shaft.

5. In a transmission in which a power input shaft supplies power to a concentric main shaft, improved gear means for transmitting power from the input shaft to the main shaft alternatively in the same direction and in the opposite direction of rotation comprising:
  (A) a sun gear splined to the power input shaft and having a plurality of engaging means extending from one face of the gear;
  (B) a plurality of spur gears driven by the sun gear;
  (C) a ring gear mounted around the main shaft and driven by the spur gears in a direction opposite to the direction of rotation of the sun gear and having a plurality of engaging means extending from one face; and,
  (D) a drive sleeve slidably mounted around the main shaft and keyed to the main shaft and having a plurality of engaging means extending from each of two opposite faces, one set of engaging means adapted to engage the engaging means extending from the sun gear and the second set adapted to engage the engaging means extending from the face of the ring gear.

6. A transmission as claimed in claim 5 in which the engaging means on the sun gear, ring gear and drive sleeve are mating dogs.

7. In a transmission having a main shaft, improved power output means connected to the main shaft comprising:
  (A) a sun gear splined to the main shaft;
  (B) a plurality of planetary gears positioned around the sun gear and driven by the sun gear;
  (C) a brake disk mounted around the main shaft and fastened to the planetary gears;
  (D) a clutch disk mounted around the main shaft adjacent the brake disk, said disk having gear teeth meshing with the planetary gears;
  (E) braking means positioned to selectively prevent rotation of one of the brake disk and the clutch disk; and,
  (F) power take-off means affixed to the brake disk.

8. The improvement set forth in claim 7 wherein said braking means comprises a plurality of brake pads, one brake pad being positioned on the outboard side of each disk and a brake pad positioned between the disks and being movable alternatively into contact with the inboard side of said disks.

9. The improvement of claim 8 wherein the brake pad between the disks is mounted on a pivotable lever and cam.

10. A power transmission comprising:
  (A) a main shift;
  (B) a power input shaft concentric with the main shaft and mounted around a portion of the main shaft for rotation independent of the rotation of the main shaft;
  (C) gear means for transmitting power from the power input shaft to the main shaft, said gear means including:
    (1) a sun gear splined to the power input shaft and having a plurality of dogs extending from one face of the gear,
    (2) a plurality of spur gears driven by the sun gear,
    (3) a ring gear mounted around the main shaft and driven by the spur gears in a direction opposite to the direction of rotation of the sun gear and having a plurality of dogs extending from one face,
    (4) a drive sleeve slidably mounted around the main shaft and keyed to the main shaft and having a plurality of dogs extending from each of two opposite faces, one set of dogs adapted to engage the dogs extending from the sun gear and the second set adapted to engage the dogs extending from the face of the ring gear,
    (5) means for sliding the drive sleeve along the main shaft to engage the dogs on the drive sleeve selectively with the dogs extending from the sun gear and the dogs extending from the ring gear,
  (D) a pair of independent power output means connected to opposite ends of the main shaft, each means including:
    (1) a sun gear splined to the main shaft,
    (2) a plurality of planetary gears positioned around the sun gear and driven by the sun gear,
    (3) a brake disk fastened to the planetary gears and having an outwardly extending portion,
    (4) a clutch disk mounted around the main shaft adjacent the brake disk, said disk having gear teeth meshing with the planetary gears whereby the clutch disk is driven by the planetary gears, said clutch disk having an outwardly extending portion facing the outwardly extending portion of the brake disk,
    (5) braking means positioned between the outwardly extending portions of the brake disk and the clutch disk,
    (6) means for selectively forcing the braking means into contact with the brake disk and the clutch disk, and (7) power take-off means affixed to the brake disk.

References Cited

UNITED STATES PATENTS

| | | | |
|---|---|---|---|
| 2,731,838 | 1/1956 | Wagner | 74—15.2 |
| 3,074,285 | 1/1963 | Hausmann | 74—15.2 |
| 393,310 | 11/1888 | Miller | 74—288 X |
| 1,463,287 | 7/1923 | Miller et al. | 74—332 X |
| 1,558,311 | 10/1925 | Sweet | 74—665 |
| 2,023,585 | 12/1935 | Harvey | 74—332 X |
| 2,314,664 | 3/1943 | Shenstone | 74—695 |
| 3,398,819 | 8/1968 | Ruhl et al. | 74—665 X |
| 2,272,934 | 2/1942 | Cotal. | |

FOREIGN PATENTS

| | | |
|---|---|---|
| 10,242 | 5/1913 | Great Britain. |
| 887,756 | 1/1962 | Great Britain. |

ARTHUR T. McKEON, Primary Examiner

U.S. Cl. X.R.

74—665; 192—4